(12) United States Patent
Makino et al.

(10) Patent No.: US 10,461,589 B2
(45) Date of Patent: Oct. 29, 2019

(54) MAGNETIC-PLATE LAMINATED BODY AND MOTOR

(71) Applicants: TOHOKU UNIVERSITY, Miyagi (JP); Panasonic Corporation, Osaka (JP)

(72) Inventors: Akihiro Makino, Miyagi (JP); Nobuyuki Nishiyama, Miyagi (JP); Yukio Nishikawa, Osaka (JP); Tohru Kojima, Osaka (JP); Takeshi Ogawa, Osaka (JP)

(73) Assignees: TOHOKU MAGNET INSTITUTE CO., LTD., Miyagi (JP); PANASONIC CORPORATION, Osaka (JP)

(*) Notice: Subject to any disclaimer, the term of this patent is extended or adjusted under 35 U.S.C. 154(b) by 177 days.

(21) Appl. No.: 15/426,351

(22) Filed: Feb. 7, 2017

(65) Prior Publication Data
US 2017/0229930 A1    Aug. 10, 2017

(30) Foreign Application Priority Data

Feb. 9, 2016 (JP) .................................. 2016-023039
Jan. 12, 2017 (JP) .................................. 2017-003610

(51) Int. Cl.
| | | |
|---|---|---|
| *H02K 1/00* | (2006.01) | |
| *H02K 1/14* | (2006.01) | |
| *H02K 1/02* | (2006.01) | |
| *H02K 1/22* | (2006.01) | |
| *H02K 3/18* | (2006.01) | |

(52) U.S. Cl.
CPC .............. *H02K 1/146* (2013.01); *H02K 1/02* (2013.01); *H02K 1/22* (2013.01); *H02K 3/18* (2013.01)

(58) Field of Classification Search
CPC ............ H02K 1/146; H02K 1/22; H02K 1/02; H02K 3/18
USPC ..................... 310/216.001–216.137
See application file for complete search history.

(56) References Cited

U.S. PATENT DOCUMENTS

| | | | | |
|---|---|---|---|---|
| 6,420,813 B1* | 7/2002 | DeCristofaro | ........... | H02K 1/02 310/156.01 |
| 7,262,534 B2* | 8/2007 | Baba | ...................... | H02K 1/146 310/153 |
| 7,812,485 B2* | 10/2010 | Bi | ........................... | H02K 1/30 310/216.121 |
| 2004/0174086 A1* | 9/2004 | White | ...................... | H02K 1/06 310/216.004 |
| 2009/0140597 A1* | 6/2009 | LeFlem | .................... | F03B 13/16 310/216.016 |

(Continued)

FOREIGN PATENT DOCUMENTS

| | | |
|---|---|---|
| JP | 06-145917 | 5/1994 |
| JP | 2007-311652 | 11/2007 |
| JP | 2017-99158 | 6/2017 |

*Primary Examiner* — Hanh N Nguyen
(74) *Attorney, Agent, or Firm* — Wenderoth, Lind & Ponack, L.L.P.

(57) ABSTRACT

A magnetic-plate laminated body includes: a laminated part made up of a plurality of laminated soft magnetic ribbons; first and second metal plates that sandwich the laminated part from upper and lower surfaces in a lamination direction of the laminated part; and a fastening mechanism that penetrates the first and second metal plates and the laminated part and fastening the laminated part by the first and second metal plates.

10 Claims, 7 Drawing Sheets

(56) References Cited

U.S. PATENT DOCUMENTS

2011/0241455 A1\* 10/2011 Yoshida ................. H02K 1/12
                                                        310/44

\* cited by examiner

MAGNETIC-PLATE LAMINATED BODY AND MOTOR

BACKGROUND OF THE INVENTION

1. Field of the Invention

The present invention relates to a magnetic-plate laminated body of laminated soft magnetic ribbons and a motor using the magnetic-plate laminated body as a stator.

2. Description of the Related Art

For a magnetic-plate laminated body of an iron core (stator) for a conventional motor, pure iron or electromagnetic steel plates are used. In some motors aiming for higher efficiency, amorphous ribbons or ribbons having nanocrystal grains are used for the iron core (see, e.g. Japanese Laid-Open Patent Publication No. H06-145917).

FIG. 5 is a diagram of a structure of a conventional motor described in Patent Document 1. To form a stator core used in this motor, an amorphous alloy ribbon fabricated by a liquid quenching method such as a single-roll method and a double-roller method is first processed into a predetermined shape by a method such as winding, cutting, punching, and etching, before being laminated etc.

On the other hand, in Japanese Laid-Open Patent Publication No. 2007-311652, a laminated material 27 is manufactured by heating and pressure-bonding a plurality of amorphous alloy ribbons 28 coated with an adhesive and electromagnetic steel plates 29 overlapped with each other. FIG. 6 is a perspective view of the amorphous laminated material 27. It is described that this makes handling easier.

PRIOR ART DOCUMENTS

Patent Documents

Patent Document 1: Japanese Laid-Open Patent Publication No. H06-145917 A
Patent Document 2: Japanese Laid-Open Patent Publication No. 2007-3116552 A However, in the conventional configuration of FIG. 5, when amorphous or crystallized soft magnetic ribbons are laminated to produce a component such as an iron core, the laminated body is low in rigidity and therefor is difficult to handle as a single body. When the laminated body is fastened and fixed, an unrestrained portion other than a fastened portion is low in rigidity and therefor allows air to remain, resulting in a deflection causing a gap.

FIGS. 7A to 7C show fastened states of a laminated body having a conventional structure. FIG. 7A is a side view, FIG. 7B is a top view, and FIG. 7C is an enlarged side view. A laminated part 21 of soft magnetic thin ribbons is attached to a substrate 24 by bolts 23 via washers 22. In an enlarged view of an unrestrained portion (c), a gap 26 is generated between soft magnetic ribbons 25 due to deflection of the soft magnetic ribbons 25, causing a deterioration in space factor. As a result, a proportion of a magnetic material per unit volume decreases, leading not only to a deterioration in the soft magnetic characteristics for the laminated body but also to an unstable shape.

Additionally, the configuration of FIG. 6 has the adhesive included between amorphous ribbon layers and therefore has a problem of deterioration in space factor resulting in a poor motor efficiency.

SUMMARY OF THE INVENTION

The present invention solves the conventional problems and an object thereof is to provide a magnetic-plate laminated body capable of ensuring rigidity and stabilizing magnetic characteristics at the time of fastening and fixing.

A magnetic-plate laminated body includes:
a laminated part made up of a plurality of laminated soft magnetic ribbons;
first and second metal plates that sandwich the laminated part from upper and lower surfaces in a lamination direction of the laminated part; and
a fastening mechanism that penetrates the first and second metal plates and the laminated part and fastening the laminated part by the first and second metal plates.

With this configuration, the entire laminated part of the soft magnetic ribbons can be restrained in the lamination direction by the metal plates with high rigidity. As a result, since the rigidity of the laminated body is ensured and the laminated body is pressed on the entire surfaces, the soft magnetic ribbons in the laminated portion can be prevented from deflecting and stabilized in the magnetic characteristics.

As described above, the magnetic-plate laminated body of the present invention can ensure the rigidity of the laminated body and stabilize the magnetic characteristics at the time of fastening and fixing.

DESCRIPTION OF THE PREFERRED EMBODIMENTS

Figure 1A:
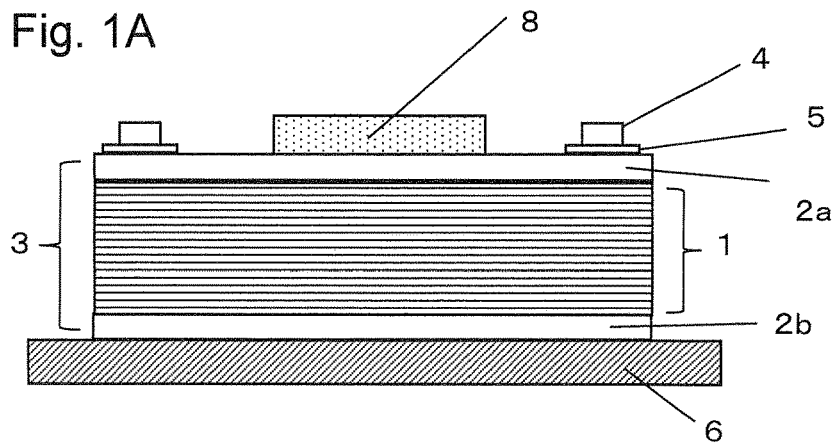
FIG. 1A is a side view of a motor using a magnetic-plate laminated body according to a first embodiment.

As a magnetic-plate laminated body of first aspect, a magnetic-plate laminated body includes:
a laminated part made up of a plurality of laminated soft magnetic ribbons;
first and second metal plates that sandwich the laminated part from upper and lower surfaces in a lamination direction of the laminated part; and
a fastening mechanism that penetrates the first and second metal plates and the laminated part and fastening the laminated part by the first and second metal plates.

As a magnetic-plate laminated body of second aspect, in the first aspect, in the plurality of soft magnetic ribbons, the soft magnetic ribbons may locally contact with each other and have clearances between positions at which the soft magnetic ribbons contact with each other.

As a magnetic-plate laminated body of third aspect, in the second aspect, the soft magnetic ribbons may have a space factor defined as a volume percentage equal to or greater than 70% relative to the laminated part with the balance being the clearances.

As a magnetic-plate laminated body of fourth aspect, in any one of the first to third aspects, the soft magnetic ribbons each may have a thickness of 0.01 mm or more and 0.1 mm or less.

As a magnetic-plate laminated body of fifth aspect, in any one of the first to fourth aspects, the first and second metal plates may have soft magnetic property.

As a magnetic-plate laminated body of sixth aspect, in any one of the first to fourth aspects, the first and second metal plates may have non-magnetic property.

As a magnetic-plate laminated body of seventh aspect, in any one of the first to sixth aspects, the plate thickness of each of the first and second metal plates may be at least six times as thick as each of the soft magnetic ribbons and may be equal to or less than 20% of the thickness of the laminated body.

As a magnetic-plate laminated body of eight aspect, in the seventh aspect, the first and second metal plates may be formed by laminating two or more metal plates.

As a magnetic-plate laminated body of ninth aspect, in any one of the first to eighth aspect, further includes a third metal plate provided in the laminated part.

As a motor of tenth aspect, a motor includes:
a rotor; and
a stator made up of the magnetic-plate laminated body according to any one of the first to ninth aspect, the stator having the rotor rotatably stored therein.

A magnetic-plate laminated body and a motor according to embodiments will now be described with reference to the accompanying drawings. In the drawings, substantially the same members are denoted by the same reference numerals.

First Embodiment

Figure 1B:
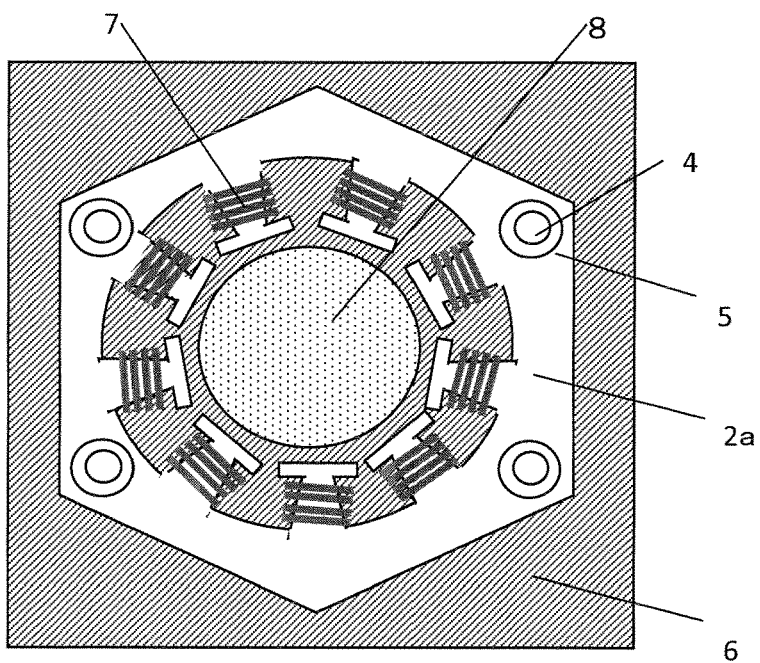
FIG. 1B is a top view thereof.
Figure 1C:
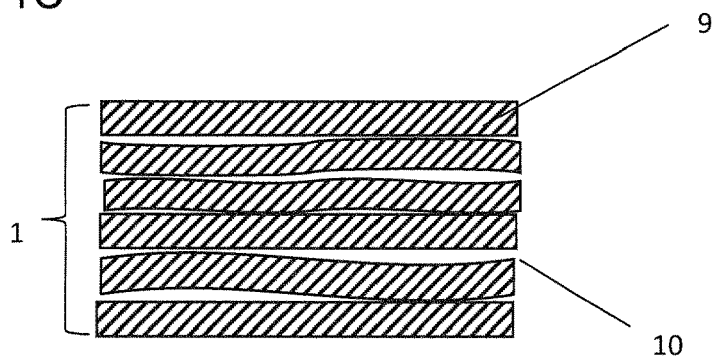
FIG. 1C an enlarged view of a laminated part.

FIGS. 1A to 1C are views showing a configuration of a motor using a magnetic-plate laminated body in a first embodiment and specifically show a brushless motor. FIG. 1A is a side view of the motor using a magnetic-plate laminated body 3; FIG. 1B is a top view; and FIG. 1C is an enlarged view of a laminated part 1. In FIG. 1A, a projecting part of a winding portion is not shown.

As shown in FIGS. 1A to 1C, this magnetic-plate laminated body 3 includes the laminated part 1 of laminated amorphous or nanocrystal grain-containing soft magnetic metal ribbons 9, nonmagnetic austenitic stainless steel plates 2a, 2b that are two metal plates sandwiching the laminated part 1 from upper and lower surfaces in the lamination direction, and fastening mechanisms 4, 5 penetrating the two metal plates 2a, 2b and the laminated part 1 and fastening the laminated part 1 by the two metal plates (first and second metal plates) 2a, 2b. In the laminated part 1 of the soft magnetic metal ribbons 9, the soft magnetic metal ribbons 9 are laminated to each other without using an adhesive. In this laminated body 3, since no adhesive is used when the soft magnetic metal ribbons 9 are laminated to form the laminated part 1, no adhesive is interposed in interfaces so that the soft magnetic metal ribbons can be increased in a space factor defined as a volume fraction. A smaller space factor leads to a greater thickness of the laminated part 1 for ensuring an amount of a magnetic material so as to acquire necessary magnetic characteristics. Consequently, a winding 7 wound around the laminated part 1 becomes longer and causes a greater copper loss that is the Joule heat generated in the copper wire of the winding 7, resulting in a deterioration in the motor efficiency. From the viewpoints of motor efficiency and maintenance of the shape of the laminated part 1, the space factor defined as the volume fraction of the soft magnetic metal ribbons in the laminated part 1 is preferably 70% or more.

The laminated body 3 also has cylindrical collars not shown in the figures put in four fastening holes provided in the soft magnetic metal ribbons and the stainless steel plates 2 and are fixed to a metal substrate 6 by fastening mechanisms made up of bolts 4 and washers 5. These cylindrical collars enable the positioning in a planar direction and the regulation of height of the soft magnetic ribbons and the stainless steel plates 2. Additionally, the winding 7 is provided and a rotor 8 is rotatably disposed in the center.

Although the shape of the laminated body 3 differs depending on a product, the laminated body shown in FIG. 1A to 1C is for a hermetic motor used in a refrigerator and an air conditioner and has the maximum outer diameter of 80 mm and the height of 30 mm. The soft magnetic ribbons (soft magnetic metal ribbons) each have the thickness of 0.03 mm, and the stainless steel plates 2 each have the thickness of 3 mm. The thickness of the laminated part 1 excluding the stainless steel plates 2 provided on the upper and lower sides of the laminated body 3 is 24 mm. For example, if 680 soft magnetic ribbons each having the thickness of 0.03 mm are laminated by fastening with the bolts 4, the space factor defined as the volume fraction of the soft magnetic thin ribbons relative to the laminated part 1 is 85%. When it was desired to reduce the load applied to the ribbons at the time of fastening, the space factor was 75% or more. The stainless steel plates 2 may slightly be wider than the laminated part 1 of the soft magnetic ribbons in the direction perpendicular to the lamination direction. As a result, the winding 7 can be wound around at a distance from the laminated part 1, so that the soft magnetic ribbons can be protected. A thickness range of the soft magnetic ribbons may practically be 0.01 mm or more and 0.1 mm or less. The thickness range may be 0.01 mm or more and 0.06 mm or less. The stainless steel plates 2a, 2b are sufficiently thick when the plate thickness thereof is 10 times as thick as each of the soft magnetic ribbons since an amount of deflection of a single body has an order of magnitude equal to or less than three. However, if the plate thickness is excessively thick, the proportion of the laminated part 1 in the laminated body 3 provided with the winding 7 becomes small. As a result, since the amount of the magnetic material decreases, the winding 7 becomes longer and makes only the copper loss larger, and the motor efficiency deteriorates. By setting the thickness of the stainless steel plates 2a, 2b to at most 20% or less of the thickness of the laminated body 3, the proportion of the laminated part 1 relative to the laminated body 3 is set to 60% or more, which is preferable from the viewpoint of motor efficiency.

Figure 7A:
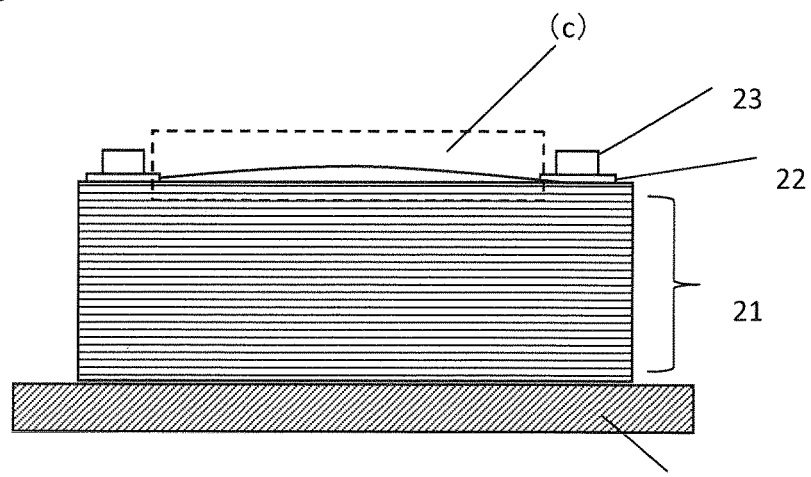
FIG. 7A is a side view of a motor using a laminated body according to a conventional structure.
Figure 7B:
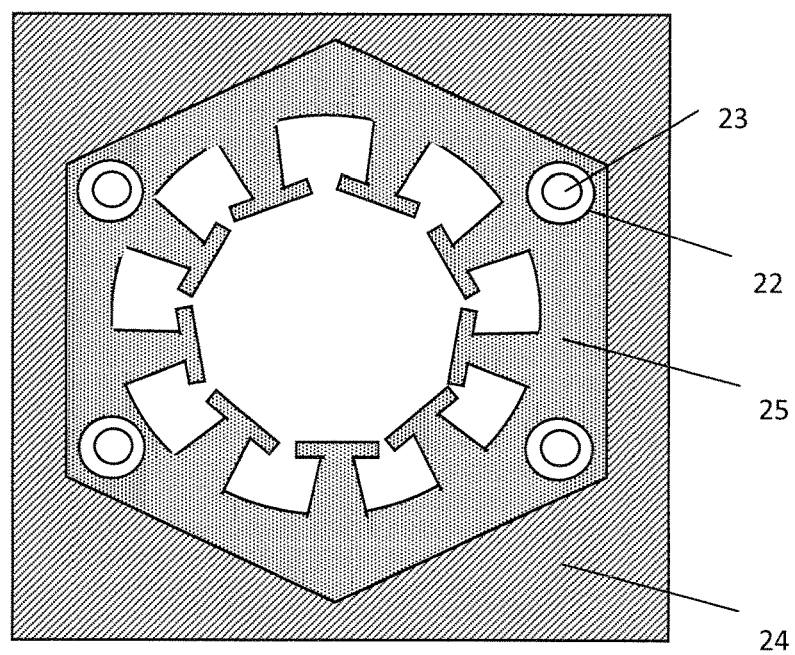
FIG. 7B is a top view thereof.
Figure 7C:
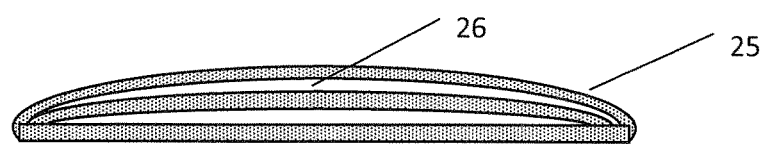
FIG. 7C is an enlarged view of a laminated part.

As shown in the enlarged view of the laminated part 1 of FIG. 1C, this laminated part 1 has gaps (clearances) 10 between the soft magnetic ribbons 9 or between the soft magnetic ribbons 9 and the stainless steel plates 2 due to a plate thickness deviation of the soft magnetic ribbons 9 or the air having entered between layers at the time of lamination. Since the laminated part 1 is compressed by the stainless steel plates 2 in the lamination direction, the cause of occurrence of the gaps due to deflection as described with reference to FIG. 7 is solved. On the other hand, the soft magnetic ribbons 9 are produced as a continuous amorphous ribbon by dropping a raw material alloy in a molten state into a rotating drum-shaped cooling apparatus. This amorphous ribbon has a plate thickness deviation of 0.5 μm or more in a width direction and a running direction due to variations in the production state. Moreover, although being less than the size of the plate thickness deviation, the amorphous ribbon has uneven surface roughness and microscopic voids associated with solidification. The amorphous ribbon is heat-treated so as to generate nanocrystal grains and, after this treatment, minute wrinkles etc. occur due to thermal strain. Therefore, when amorphous ribbons or ribbons containing nanocrystal grains are laminated, the gaps 10 are generated between the layers. To reduce the thickness deviation caused in the width direction of the amorphous ribbon, the soft magnetic ribbons 9 can be formed into a rotationally symmetric shape with respect to a central portion and laminated to rotate the orientation of the soft magnetic ribbons 9, so as to reduce a difference in lamination thickness in a certain direction. The surfaces of the soft magnetic ribbons 9 have oxide layers regardless of whether the amorphous ribbon or the ribbon containing nanocrystal grains. These gaps 10 and oxide layers are present without an adhesive between the soft magnetic ribbons 9. Therefore, even though the soft magnetic ribbons 9 are directly laminated and locally contacted with each other, the space factor can be increased as compared to the case of lamination via an adhesive, without a significant deterioration in magnetic properties, and a motor can efficiently be driven.

Second Embodiment

Figure 2:
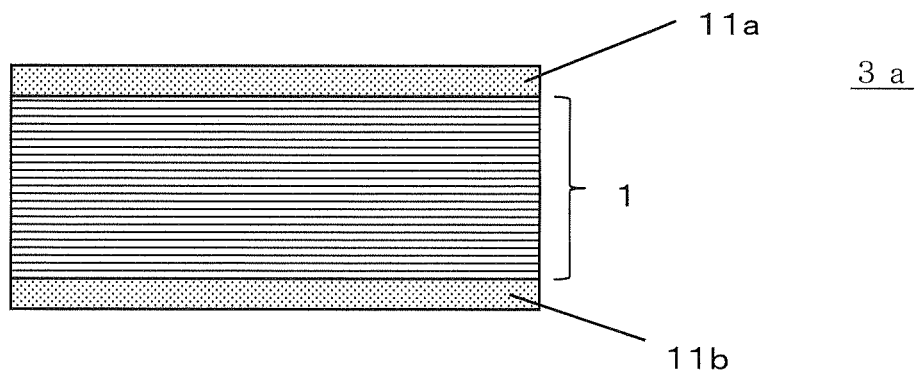
FIG. 2 is a side view of a configuration of a magnetic-plate laminated body according to a second embodiment.

FIG. 2 is a configuration diagram of a magnetic-plate laminated body 3a according to a second embodiment. As shown in FIG. 2, the magnetic-plate laminated body 3a according to the second embodiment is different from the first embodiment in that electromagnetic steel plates 11a, 11b are used as the metal plates sandwiching the laminated part 1. The electromagnetic steel plates 11a, 11b can be made of silicon steel that is a soft magnetic material as is the case with the metal ribbons, for example. The electromagnetic steel plates 11a, 11b with a plate thickness in the range of 0.15 to 0.5 mm are usable. The electromagnetic steel plates 11a, 11b preferably have a thickness greater than the thickness of the soft magnetic ribbons 9 constituting the laminated part 1. Since the electromagnetic steel plate is 0.15 mm thick and the ribbons are 0.025 mm thick in a popular combination of thin plate thickness, the ratio of the plate thickness is 6 times or more. By using the soft magnetic electromagnetic steel plates 11a, 11b as the first and second metal plates, the magnetic characteristic loss of the motor using this magnetic-plate laminated body 3a can be made smaller than the case of FIG. 1.

Third Embodiment

Figure 3:
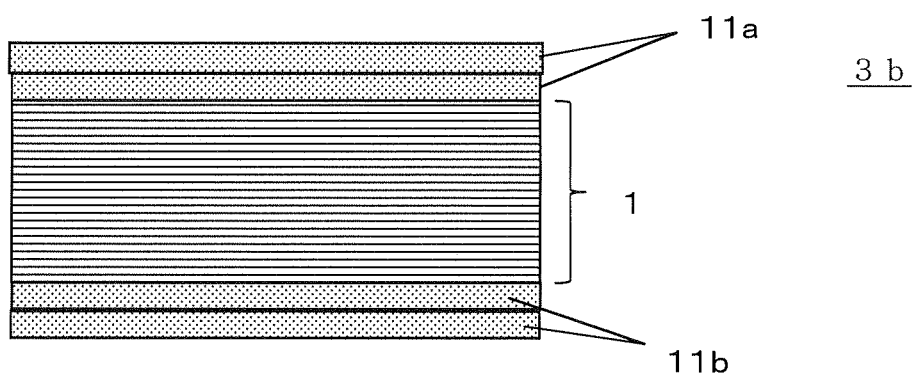
FIG. 3 is a side view of a configuration of a magnetic-plate laminated body according to a third embodiment.

FIG. 3 is a configuration diagram of a magnetic-plate laminated body 3b according to a third embodiment. As shown in FIG. 3, the magnetic-plate laminated body 3b according to the third embodiment is different from the magnetic-plate laminated bodies according to the first and second embodiments in that two each of the electromagnetic steel plates 11a, 11b are provided on the upper and lower sides of the laminated part 1. Since the electromagnetic steel plates 11a, 11b often have a thin plate thickness so as to make an eddy current loss smaller, the two or more electromagnetic steel plates 11a, 11b can be provided so as to further increase the rigidity as in the case of the thick plate thickness. To ensure the rigidity, a plurality of the electromagnetic steel plates is desirably at least partially joined and is more preferably joined between interlayer surfaces. A joining method may be any method such as adhesion, welding, and caulking.

A portion of the plurality of the electromagnetic steel plates 11a, 11b may be replaced with a nonmagnetic metal plate.

Fourth Embodiment

Figure 4:
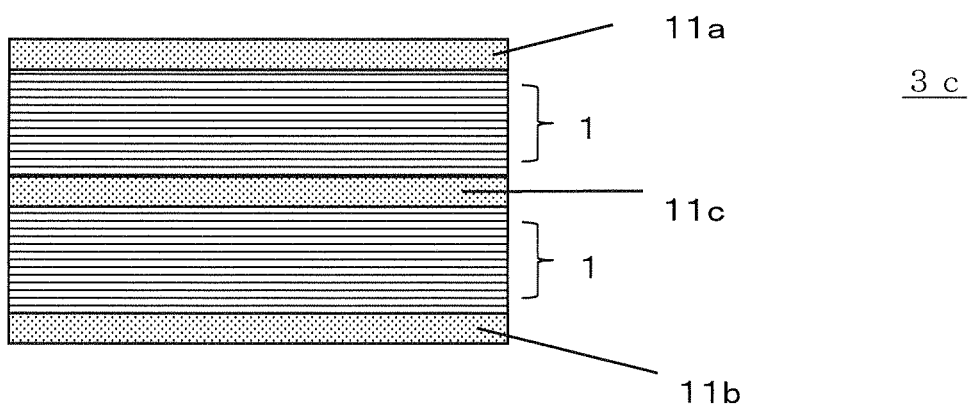
FIG. 4 is a side view of a configuration of a magnetic-plate laminated body according to a fourth embodiment.
Figure 5:
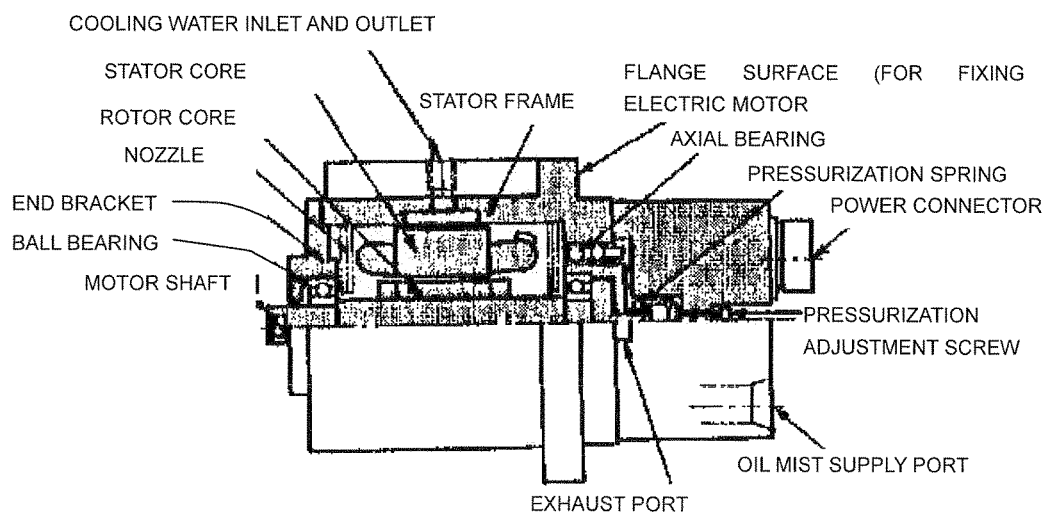
FIG. 5 is a diagram of a structure of a conventional motor described in Patent Document 1.
Figure 6:
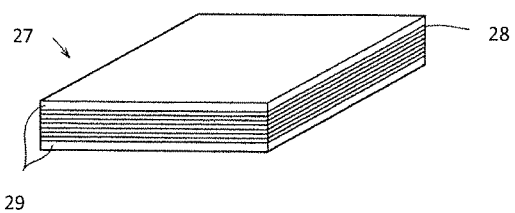
FIG. 6 is a view of a conventional magnetic-plate laminated body described in Patent Document 2.

FIG. 4 is a configuration diagram of a magnetic-plate laminated body 3c according to a fourth embodiment. As shown in FIG. 4, the magnetic-plate laminated body 3c according to the fourth embodiment is different from the magnetic-plate laminated bodies according to the first and second embodiments in that a third electromagnetic steel plate 11c is provided in the laminated part 1 in addition to the first and second metal plates 11a, 11b on the upper and lower surfaces of the laminated part 1. Because of this structure having the electromagnetic steel plate 11c provided in the laminated part 1, the rigidity of the laminated body 3c is further increased.

This disclosure includes appropriately combining arbitrary embodiments and/or examples of the various embodiments and/or examples described above so that the effects of the respective embodiments and/or examples can be produced.

According to the magnetic-plate laminated body of the present invention, the rigidity of the iron core can be ensured and the shape can be stabilized at the time of fastening. Therefore, the magnetic-plate laminated body according to the present invention is useful as a motor stator. Additionally, the magnetic-plate laminated body according to the present invention is also applicable to magnetically-applied electronic components such as transformers besides motors.

What is claimed is:

1. A magnetic-plate laminated body comprising:
a laminated part made up of a plurality of laminated soft magnetic ribbons;
first and second metal plates that sandwich the laminated part from upper and lower surfaces in a lamination direction of the laminated part; and
a fastening mechanism that penetrates the first and second metal plates and the laminated part and fastens the laminated part to the first and second metal plates,
wherein the soft magnetic ribbons have surfaces with wrinkles such that adjacent pairs of the soft magnetic ribbons locally contact each other and have clearances between the wrinkles where the soft magnetic ribbons contact each other.

2. The magnetic-plate laminated body according to claim 1, wherein the first and second metal plates have soft magnetic property.

3. The magnetic-plate laminated body according to claim 1, wherein the first and second metal plates have nonmagnetic property.

4. The magnetic-plate laminated body according to claim 1, wherein a plate thickness of each of the first and second metal plates is at least six times as thick as each of the soft magnetic ribbons and is equal to or less than 20% of a thickness of the laminated body.

5. A motor comprising:
a rotor; and
a stator made up of the magnetic-plate laminated body according to claim 1, the stator having the rotor rotatably stored therein.

6. A magnetic-plate laminated body comprising:
a laminated part made up of a plurality of laminated soft magnetic ribbons;
first and second metal plates that sandwich the laminated part from upper and lower surfaces in a lamination direction of the laminated part; and
a fastening mechanism that penetrates the first and second metal plates and the laminated part and fastens the laminated part to the first and second metal plates,
wherein the first metal plate, the second metal plate and the laminated part have a same outer shape,
wherein the soft magnetic ribbons each have a thickness of 0.01 mm or more and 0.1 mm or less,
wherein the soft magnetic ribbons have surfaces with wrinkles such that adjacent pairs of the soft magnetic ribbons locally contact each other and have clearances between the wrinkles where the soft magnetic ribbons contact each other, and
wherein the soft magnetic ribbons have a space factor defined as a volume percentage equal to or greater than 70% relative to the laminated part with a balance being the clearances.

7. A magnetic-plate laminated body comprising:
a laminated part made up of a plurality of laminated soft magnetic ribbons;
first and second metal plates that sandwich the laminated part from upper and lower surfaces in a lamination direction of the laminated part; and
a fastening mechanism that penetrates the first and second metal plates and the laminated part and fastens the laminated part to the first and second metal plates,
wherein the first and second metal plates are formed by laminating two or more metal plates having a same outer shape.

8. The magnetic-plate laminated body according to claim 7, wherein at least one of the two or more metal plates of the first and second metal plates is an electromagnetic steel plate.

9. The magnetic-plate laminated body according to claim 7, wherein all of the two or more metal plates of the first and second metal plates are electromagnetic steel plates.

10. A magnetic-plate laminated body comprising:
a laminated part made up of a plurality of laminated soft magnetic ribbons;
first and second metal plates that sandwich the laminated part from upper and lower surfaces in a lamination direction of the laminated part;
a fastening mechanism that penetrates the first and second metal plates and the laminated part and fastens the laminated part to the first and second metal plates; and
a third metal plate provided between two of the plurality of laminated soft magnetic ribbons in the laminated part.

* * * * *